United States Patent [19]

Hölting et al.

[11] 4,262,528

[45] Apr. 21, 1981

[54] APPARATUS FOR MEASURING THE TORQUE APPLIED TO A WRENCH

[75] Inventors: Johann-Peter Hölting; Armin Rahn, both of Hamburg, Fed. Rep. of Germany

[73] Assignee: C. Plath KG, Hamburg, Fed. Rep. of Germany

[21] Appl. No.: 157,749

[22] Filed: Jun. 9, 1980

Related U.S. Application Data

[63] Continuation of Ser. No. 973,312, Dec. 26, 1978, abandoned.

[30] Foreign Application Priority Data

Dec. 24, 1977 [DE] Fed. Rep. of Germany ....... 2757948

[51] Int. Cl.³ .......................................... B25B 23/142
[52] U.S. Cl. ........................................ 73/139; 33/334
[58] Field of Search ................. 73/133 R, 761, 139; 33/334, 300; 74/5.22

[56] References Cited

U.S. PATENT DOCUMENTS

| | | | |
|---|---|---|---|
| 3,386,170 | 6/1968 | von Bose | 33/318 X |
| 3,477,298 | 11/1969 | Howe | 73/504 X |
| 4,091,664 | 5/1978 | Zerver | 73/139 |

*Primary Examiner*—Charles A. Ruehl

[57] ABSTRACT

Disclosed herein is a wrench-type hand tool having apparatus for indicating the magnitude of the tightening angle through which the tool is rotated about an axis through a workpiece when applying a torque to the workpiece. The apparatus comprises a gyroscope having a rotor defining a spin axis mounted upon the tool for rotation therewith. The spin axis is oriented substantially transversely to the axis of the workpiece. Means are provided for determining the magnitude of precession of the gyroscope rotor, so that the magnitude of the tightening angle can be indicated as a function of the time integral of the magnitude of precession.

5 Claims, 1 Drawing Figure

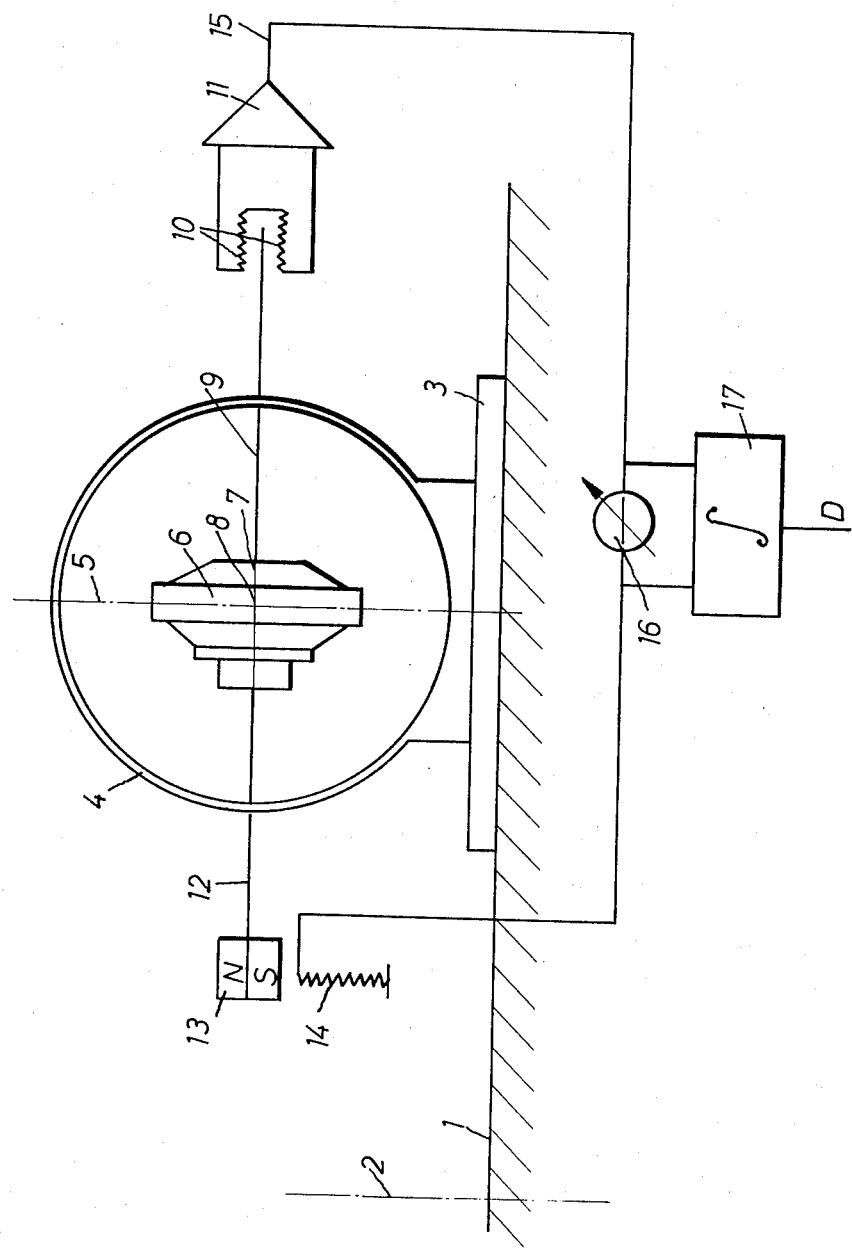

APPARATUS FOR MEASURING THE TORQUE APPLIED TO A WRENCH

This application is a continuation of application Ser. No. 973,312, filed Dec. 26, 1978, now abandoned.

The present invention relates to a device for measuring the tightening angle on a wrench with respect to a directionally fixed member possessing a high moment of inertia that is pivoted thereupon for indicating a reference direction which is characterized in that the directionally fixed member is constituted of a body possessing a high moment of inertia relative to the frictional moment of its support.

The moment of inertia of the body depends on its inertial mass which should be of a corresponding magnitude. However, a substantial inertial mass of the body may be the cause of other problems, by way of example in connection with the support of the body.

For this reason it is the object of the invention—in spite of the retention of a high moment of inertia of the body—to reduce the problems occasioned by its inertial mass.

The solution according to the present invention consists in that the body is constituted of a gyroscope which is rotatable around an axis located transversally to the axis of rotation of the wrench.

A rotating gyroscope offers considerable opposition to a swiveling motion around an axis located transversally to its axis of rotation, which may be utilized as a moment of inertia within the meaning of the invention. In this case it is possible for its inertial mass to be significantly less substantial than that of a body possessing a comparably high moment of inertia. In this way, on the one hand, the positional stability of a body possessing a high moment of inertia is achieved and, on the other hand, the substantial inertial mass of this body with the disadvantages associated therewith are avoided.

Various properties of a gyroscope, for instance, the necessity of supplying energy, make it appear desirable that—in relation to its housing—it always assumes an essentially constant position. This prerequisite is not met when it is freely rotatable around an axis located parallely to the axis of rotation of the wrench. A subordinate problem of the invention consequently is the creation of a measuring method which, on account of the relative motion of the inert body (gyroscope) with respect to the wrench, permits the determination of the angular motion of the latter without that the absolute value of the angular displacement between these elements exceeds a specific, limited degree.

The solution of the subordinate problem consists in that the gyroscope is made to travel along with the wrench, whereby at the same time the force necessary for causing the gyroscope to follow the wrench is measured and integrated over the time.

The moment with which a rotating gyroscope opposes a rotation around an axis located perpendicularly to the axis of the gyroscope is, as it happens, proportional to the angular velocity of this rotation. The integration of the angular velocity amounts to the distance travelled by the angle.

However, this measuring principle is not only applicable in the case of gyroscopes, but also in the case of bodies that are immobile per se, in the case of the latter, it is true, the force required for causing the gyroscope to follow the wrench does not represent the angular velocity, but is proportional to the angular acceleration; by means of double integration, however, the distance travelled results therefrom once more. The advantages of applying this measuring principle in the case of bodies that are immobile per se consists in that it is possible to dispense with the immobilization of the body prior to the tightening motion being initiated, as well as with making due allowance for the initial velocity of this body when evaluating the measuring results. It is possible, furthermore, to use a simpler form of support for the body since the same does not have to permit large swiveling angles and does not necessarily have to be arranged concentrically.

In contrast to the gyroscope explained in the foregoing, any body is to be understood by a body that is immobile per se, the high moment of inertia of which is utilized as described herein. Liquids should also be understood as such a body, although these may be mobile per se.

The invention will be described in the following in greater detail while reference is made to the accompanying drawing which represents an advantageous embodiment example in a schematic FIGURE.

At 1 the surface of the wrench is shown which is intended for turning the bolt or the like around the axis of rotation 2. The mounting flange 3 of the housing 4 is rigidly connected to the surface 1 of the wrench, which flange extends transversally to the plane of the drawing. The housing turns conjointly with the spanner and, whilst doing so, its angle of rotation around axis 5 is identical with that of the wrench around the axis 2. An additional translatory motion that is caused by the reciprocal distance of the axes 2 and 5, is of no importance in connection with the invention.

In the housing 4 a gyroscope is supported that is driven rotatingly around the axis 7 which, in the plane of the drawing, extends transversally to the axis 5. Inside the housing 4 the axis of rotation 7 of the gyroscope 6 is pivoted around an axis 8 which is perpendicular to the plane of the drawing. On the other hand, the gyroscope support is rigidly connected to the housing 4 with respect to axis 5.

If the housing 4 is rotated around axis 5, then the rotating gyroscope precesses around axis 8. For the determination of this precession a measuring device is provided inside housing 4. This consists of a blade 9, which is rigidly connected to the gyroscope support which is located perpendicularly to axis 8, of two coils 10, arranged at both sides of this blade at a distance from the axis 8, which coils are connected to an amplifier 11. The amplifier produces a signal when the blade 9 deviates from the mid-position, the polarity of which corresponds to the deviational direction. This measuring device is, of course, arranged inside housing 4 and has been illustrated as being located outside the housing limits solely for the sake of providing a better understanding of the invention.

The layout, as described so far, would be suitable for measuring the angle of rotation of the housing around the axis 5 since the angle formed between the orientation of blade 9 upon precession motion and its original orientation corresponds to the angle of rotation. In addition, a blade 12 located perpendicularly to the axis 8 is connected to the gyroscope support, at the end of which a device for returning the gyroscope into the starting position is arranged. In the embodiment example this device has been illustrated in the form of a permanent magnet 13 arranged at the end of the blade 12 in combination with an electromagnet 14 which is arranged rigidly mounted to the housing, which magnet is supplied by the amplifier 11 via the line 15. The amplifier has been designed in such a way that the current supplied by it possesses such an intensity that the blade 9 is always returned again into its neutral position. This means that the current flowing in line 15, which can be read off from the measuring instrument 16, is proportional to the gyroscopic motion which occurs at the gyroscope support at a predetermined angular velocity around the axis 5. A signal that is proportional to the current intensity is supplied via the integration circuit 17 and is integrated therein over the time. The signal D resulting therefrom is proportional to the pivoting angle of the housing 4 around the axis 5 and, thereby, to the tightening angle of the wrench around the axis 2. On an appropriate indicating device it is indicated as angle of rotation.

It can be seen that due to the follow-up motion, which, in the case of a rotating gyroscope, does not take place around the pivoting axis 5 but around the precession axis 8, the gyroscope essentially retains its original position so that neither the energy supply to the gyroscope nor any proportionality shortcomings in the precession of the gyroscope out of its normal position are of any relevance. For this reason it is possible to use simple supports that are not susceptible to shocks, viz., for instance, spiral springs.

This likewise applies when inert bodies that are immobile per se are utilized instead of a gyroscope, in which case, however, the pivotability, the angular measuring and the return motion would be related to the axis 5. The torque necessary for the return motion, which would appear as current intensity on the measuring instrument, is proportional when an angular acceleration of the body takes place, the double integration of which leads to a signal D being produced in the integration circuit 17, which, once more is proportional to the angular distance covered and which can be indicated as such on the instrument.

We claim:

1. In a wrench-type hand tool, apparatus for indicating the magnitude of the tightening angle through which the tool is rotated about an axis through a workpiece when applying a torque to the workpiece, the apparatus comprising:
    a gyroscope having a rotor defining a spin axis mounted upon the tool for rotation therewith, with the spin axis being oriented substantially transversely to the workpiece axis;
    means for determining the magnitude of precession of the gyroscope rotor; and
    means for indicating the magnitude of the tightening angle as a function of the time integral of the magnitude of precession.

2. Tool according to claim 1, wherein the precession determining means comprise:
    a sensor for generating a signal representative of a change in orientation of the spin axis of the rotor from an initial spin axis orientation;
    restoring means for returning the rotor to the initial spin axis orientation; and
    means for applying the signal generated by the sensor to the restoring means.

3. Tool according to claim 2, wherein the restoring means are energized by the application of the amplified signal generated by the sensor.

4. Tool according to claim 2 or claim 3, wherein the indicating means comprise circuitry for forming the time integral of the signal generated by the sensor.

5. In a wrench-type hand tool, apparatus for indicating the magnitude of the tightening angle through which the tool is rotated when applying a torque to a workpiece, the apparatus comprising:
    a gyroscope having a rotor defining the spin axis of the gyroscope;
    supporting means for mounting the gyroscope to the tool to permit directional changes of the spin axis orientation from an initial orientation due to precession of the rotor during rotation of the tool through the tightening angle;
    sensing means for generating a signal representative of the magnitude of rotor precession;
    restoring means, energized by the signal, for returning the gyroscope to the initial orientation; and
    read out means forming the time integral of the signal for indicating the tightening angle.

* * * * *